(12) United States Patent
Kamps et al.

(10) Patent No.: US 7,373,910 B2
(45) Date of Patent: May 20, 2008

(54) ARRANGEMENT FOR SEALING A HOUSING

(75) Inventors: Thomas Kamps, Kurten (DE); Jurgen Kurth, Odenthal (DE)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 11/498,740

(22) Filed: Aug. 4, 2006

(65) Prior Publication Data
US 2007/0032121 A1 Feb. 8, 2007

(30) Foreign Application Priority Data
Aug. 5, 2005 (EP) .................... 05017038

(51) Int. Cl.
*F02F 7/00* (2006.01)
(52) U.S. Cl. ............... 123/195 C; 123/90.38
(58) Field of Classification Search ............ 123/195 C, 123/198 E, 198 R, 90.38; 277/591, 575, 277/574, 504, 565
See application file for complete search history.

(56) References Cited
U.S. PATENT DOCUMENTS

| | | | | |
|---|---|---|---|---|
| 3,917,286 A | * | 11/1975 | Loyd ............................ | 277/504 |
| 4,484,751 A | * | 11/1984 | Deuring ........................ | 277/574 |
| 4,799,691 A | * | 1/1989 | Stritzke et al. .............. | 277/575 |
| 5,354,073 A | * | 10/1994 | Ecker et al. ................. | 277/591 |
| 5,462,288 A | * | 10/1995 | Hering et al. ............... | 277/565 |

FOREIGN PATENT DOCUMENTS

| | | |
|---|---|---|
| DE | 4 217 131 C1 | 12/1993 |
| DE | 42 16 568 A1 | 12/1993 |
| EP | 0 571 284 A1 | 11/1993 |
| EP | 0 825 334 A1 | 2/1998 |
| EP | 0 503 143 B2 | 4/2000 |

OTHER PUBLICATIONS

Extended European Search Report issued by the European Patent Office in corresponding EP Application No. 06 01 5647, and an accompanying English language translation.

* cited by examiner

*Primary Examiner*—Stephen K. Cronin
*Assistant Examiner*—Hyder Ali
(74) *Attorney, Agent, or Firm*—Buchanan Ingersoll & Rooney PC

(57) ABSTRACT

An arrangement for sealing a housing with a cover that includes a central hole for holding a gasket for a shaft extending through the gasket in the installed state, and at least first and second hollow-cylindrical protuberances which project roughly in the direction of the shaft relative to the areas of the cover which directly surrounds them. The protuberances are inserted into the corresponding cavities of the housing. The peripheral surfaces of the first protuberance and its respective cavity adjoin one another essentially without play, and the second protuberance can be essentially freely positioned within its cavity in the direction of a line which connects the two center points of the two protuberances, with the second protuberance adjoining at least one point of the peripheral surface of the cavity in the direction of the cavity diameter which is perpendicular to the line.

18 Claims, 3 Drawing Sheets

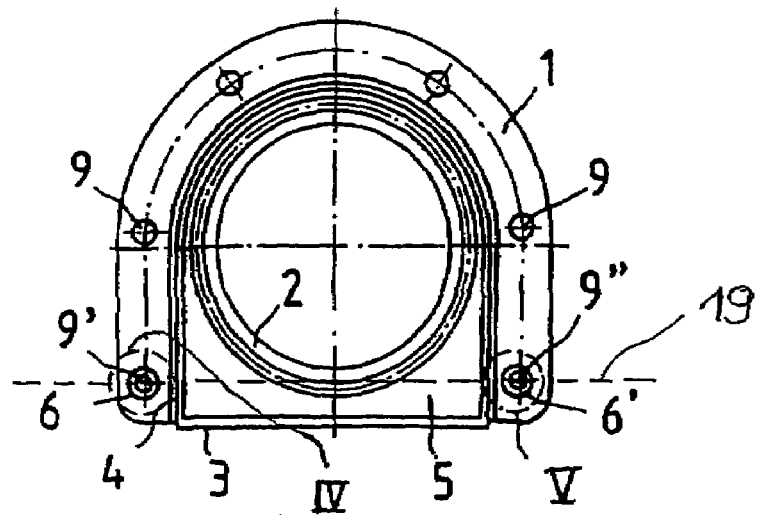
FIG. 1
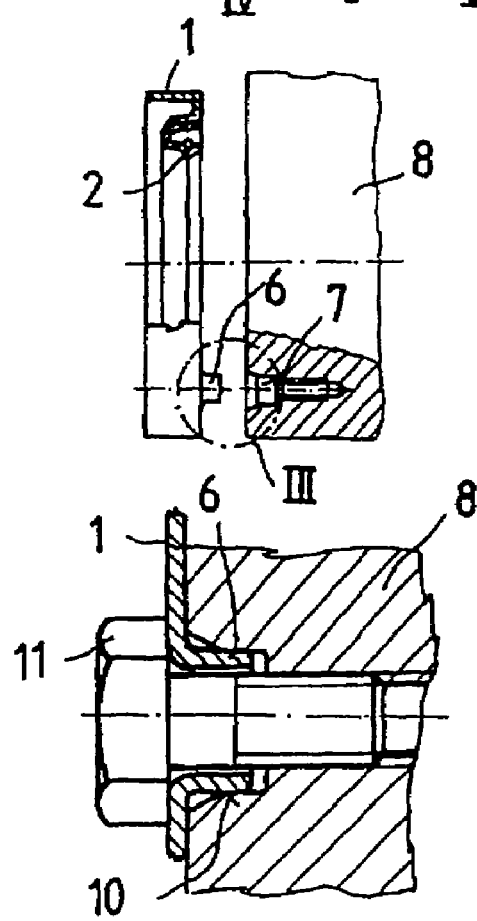
FIG. 2
FIG. 3

ARRANGEMENT FOR SEALING A HOUSING

FIELD OF THE INVENTION

The invention generally relates to sealing arrangements. More particularly, the invention pertains to an arrangement for sealing a housing with a cover.

BACKGROUND DISCUSSION

Housing sealing covers with a shaft bushing, especially for the rear crankshaft seal, are always subject to installation space restriction. The overall height of the housing sealing cover including its fasteners is of decisive importance, but can be influenced essentially only via the thickness of the flange section of the housing sealing cover under the fasteners. For this reason housing sealing covers of drawn sheet metal have become established on the market.

Housing sealing covers for crankshaft penetrations on internal combustion engines can be centered with respect to the crankshaft and engine block via two protruding cylinders which are drawn symmetrically out of the sheet metal carrier element of the housing sealing cover. These protrusions are able to combine a screw penetration and centering function. These centering protrusions, known for example from EP 0 503 143 B1, must be dimensioned such that they can be installed for all tolerance limit positions. This requires a corresponding nominal clearance or nominal play between the protrusions of the housing sealing cover and the corresponding holes of the engine block. EP 0 503 143 B1 furthermore describes that in order to simplify installation, there are protrusions which are arched on at least two screw passage guides and which have three deviations from a circular shape spaced along the periphery of each protrusions, and thus make contact in three spots in the holes of the engine block. The protrusions thus fit without play into the respective holes.

SUMMARY

An arrangement for sealing a housing with a cover contains the following features. The cover comprises a central hole for holding a gasket for a shaft which extends through the gasket in the installed state, and the cover comprises at least a first and a second hollow-cylindrical protuberance which project in the direction of the shaft relative to the areas of the housing sealing cover which directly surrounds them, and which are intended for insertion into respective cavities of the housing. The peripheral surfaces of the first protuberance and its respective cavity are made to adjoin one another without play and in an accurately fitting manner, and the second protuberance and its respective cavity are made such that the protuberance can be freely positioned within the cavity in the direction of a line which connects the two center points of the two protuberances, with the second protuberance adjoining at least one point of the peripheral surface of the cavity in the direction of the cavity diameter which is perpendicular to the line.

In this connection, the design separation of the two protuberance-cavity pairs into a fitted pair, for example in the version as a circle/circle cylinder pair, and into a protuberance-cavity pair which is intended for spot contact, for example in the version as a circle/ellipse cylinder pair, with maximum freedom in the axial direction of the protuberances, yields a minimum position tolerance between the cover and the housing and associated therewith the shaft. Thus so-to-speak functional separation of rotational and translational guidance is achieved. Therefore the advantage of this approach lies in simplified installation due to the increased degree of axial freedom. Here the elliptical element of the circle/ellipse cylinder pair can be made for example as an oblong hole on the housing, for example on the engine block or as an arched oval on the sheet metal carrier element of the cover.

To reduce the nominal play between the cover and housing, the first protuberance is made for example from the drawn sheet metal of the cover with minimum play with respect to its corresponding cavity on the housing, for example a hole on the engine block, and thus undertakes spot positioning of the two components to one another. The second protuberance in the periphery is for example much smaller than the first, with the center points of the two protuberances forming a common axis. So that the cover cannot be turned out of the axial position, the second, much smaller protuberance on its periphery deviates from the circular shape on two points opposite one another, for example on the diameter of the protuberance, in the direction of a normal of the common axis and thus comes into contact with at least one of these projections with a second cavity on the housing. With this concept, tolerances from the spacing and the position of the protuberances can be compensated.

In one advantageous embodiment at least one of the protuberances of plastic can be injected on the sheet metal carrier of the cover positionally oriented.

BRIEF DESCRIPTION OF THE DRAWING FIGURES

Other advantages, features, and details of the invention will become apparent from the embodiments disclosed herein by way of example with reference to the accompanying drawing figures briefly described below.

FIG. 1 is a view of a housing sealing cover as disclosed herein.

FIG. 2 is a side view of the housing sealing cover of FIG. 1 and the pertinent crankshaft housing.

FIG. 3 is an enlarged view of the circled portion of the housing sealing cover and crankshaft housing identified as III shown in FIG. 2.

DETAILED DESCRIPTION

Figure 4:
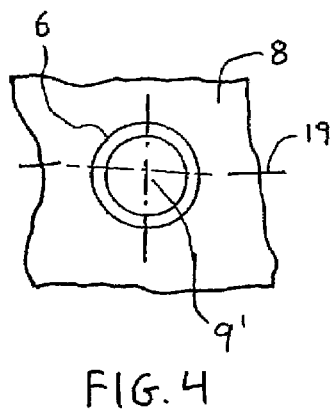
FIG. 4 is an enlarged view of the circled portion of the housing sealing cover identified as IV in FIG. 1.

The housing sealing cover 1 shown in FIG. 1 is one example of a housing sealing cover disclosed herein for sealing a crankshaft housing 8 of a motor vehicle engine. The cover 1 is in the form of a sheet metal body drawn in a pot shape, including a central hole. To seal the crankshaft, a dynamically loaded lip gasket 2 of elastomer material is used. The gasket 2 is held in the central hole of the body, with a shaft (generally indicated by the dotted line S in FIG. 2) adapted to extend through the gasket in the installed state. In other embodiments, the gasket can of course also have a sealing section of PTFE with a fluid return structure. For static sealing, sealing strips 3, 4 are provided on the radial flange surface 5. In the installed state, the sealing strip 4 adjoins the crankshaft housing 8 and is braced or secured using screws 11 which are inserted into or through the holes 9, 9' and 9". For positioned attachment or as a centering means, at least two of the holes 9', 9" are made with hollow cylindrical protrusions or protuberances 6, 6' as is also shown in FIG. 2.

The hollow cylindrically shaped protuberances 6, 6' when installed or otherwise provided in the housing sealing cover 1 engage respective cavities 7 of the crankshaft housing 8 in this illustrated embodiment, the protuberances 6, 6' are integrally formed in one piece with the remainder of the body forming the cover. The cavities 7 are used at the same time as receiving holes or the screws 11 which can be inserted through the holes 9', 9" as is illustrated in FIGS. 2 and 3. In this way, setpins can advantageously be omitted.

The protuberance 6 and the respective cavity 7 are made to fit accurately to one another without play by a circular cylindrical outside peripheral surface or jacket section of the protuberance 6 and the corresponding boundary of the cavity 7. Conversely, the protuberance 6' and its respective cavity 7 are made such that the protuberance 6' can be essentially freely positioned within the respective cavity 7 in the direction of a line 19 which connects the two center points of the two protuberances 6, 6' and that the protuberance 6' adjoins at least at one point the peripheral surface of the cavity 7 in the direction of the diameter of the cavity 7 which is perpendicular to the line 19. For this reason, the protuberance 6' is made in the manner of a hollow cylinder and includes on its sides opposite (diametrically opposite) each other in the peripheral direction of the protuberance 6' a bulge 12. Thus, the protuberance 6' includes two bulges 12 positioned diametrically opposite one another and extending radially outwardly from the outer surface of the protuberance 6' to tightly engage the periphery of the respective cavity. The apices of the bulges 12 lie roughly along the indicated diameter, with at least one bulge being provided in the cavity 7 for contact with the peripheral surface of the cavity.

In this disclosed embodiment all of the cavities 7 are made identically with the same diameters. Thus, the portion of the protuberance 6' outside the area of the bulges 12 has a much smaller outside diameter than the protuberance 6. With this arrangement and configuration of the protuberances 6, 6' and their interplay with the corresponding cavities 7, the housing sealing cover can be attached to the housing with relatively little position tolerance, yet permits ease of installation, with a relatively simple and economical capacity to be manufactured FIG. 6 illustrates an example of another embodiment in which the protuberance 6" is not drawn out of the sheet metal body of the cover 1 like the protuberances 6, 6' in FIGS. 1-5. Instead, the cover 1' simply has openings on which hollow cylindrical protuberances 6" of plastic are injected. With the indicated plastic injection technology, it is possible in a comparatively easier and less complex manner to implement the most varied executions of the protuberances 6, 6'.

Figure 5:
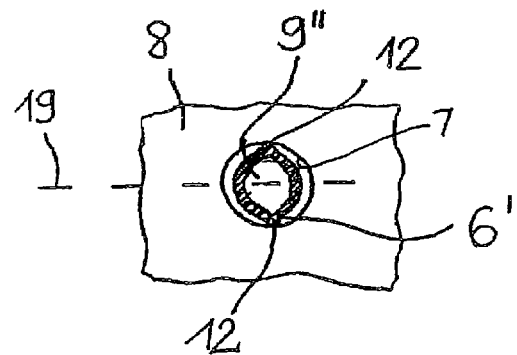
FIG. 5 is an enlarged view of the circled portion of the housing sealing cover identified as V in FIG. 1.
Figure 7:
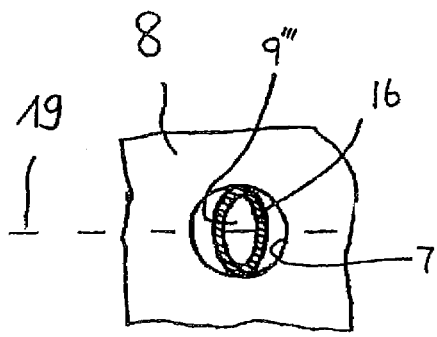
FIG. 7 is an enlarged view similar to FIG. 5 showing an alternative configuration for the cylindrical protrusion and the corresponding cavity in the housing.
Figure 6:
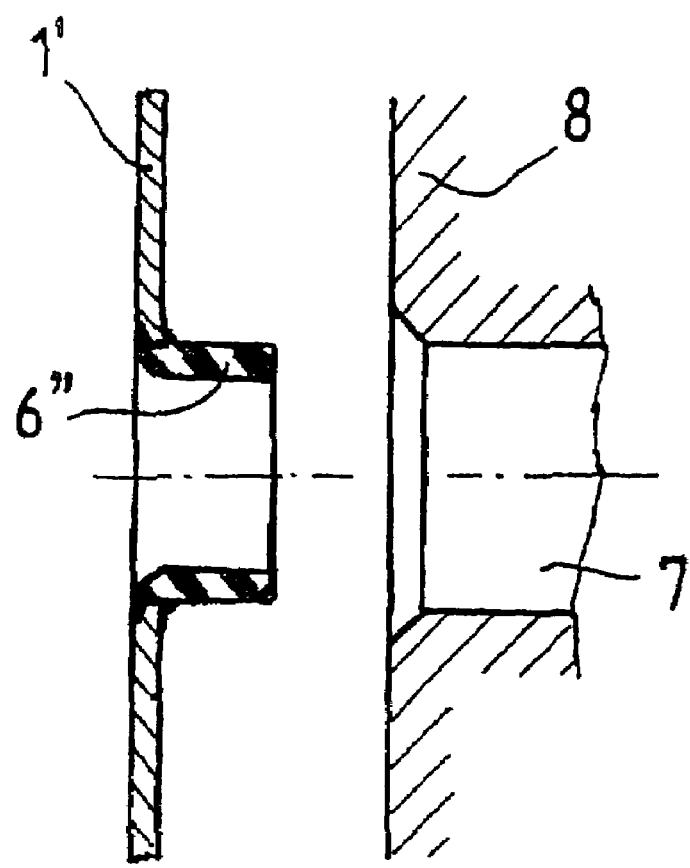
FIG. 6 is an illustration of an alternative to FIGS. 1-4.

FIG. 7 illustrates a variation on the configuration of the protuberance shown in FIG. 5. In the embodiment of FIG. 7, instead of bulges extending radially outwardly from the outer periphery of the cylindrical protuberance, the protuberance 16 possesses an elliptical cross-section and is fitted into a circularly shaped cavity 7 in the housing 8. The minor axis of the elliptical cross-section of the protuberance 16 is parallel to and along the line 19 which connects the two center points of the two protuberances 6, 16, while the major axis the elliptical cross-section is perpendicular to the line 19. Thus, the protuberance 16 and its respective cavity 7 are made such that the protuberance 16 can be essentially freely positioned within the respective cavity 7 in the direction of the line 19 which connects the two center points of the two protuberances 6, 16, yet the protuberance 16 adjoins at least at one point the peripheral surface of the cavity 7 in the diametrical direction of the cavity 7 which is perpendicular to the line 19. In the illustrated embodiment, the protuberance adjoins or tightly engages the periphery of the cavity at two positions located diametrically opposite one another. The minor axis dimension of the protuberance 16 is smaller than the outer diameter of the other cylindrically shaped protuberance 6 (shown in FIG. 4). It is to be understood that the protuberance 16 shown in FIG. 7 is provided on a housing cover which also includes the protuberance 6 shown in FIG. 4 which is adapted to engage its respective cavity in the manner described above.

Figure 8:
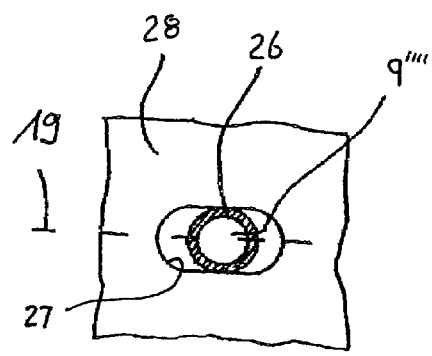
FIG. 8 is an enlarged view similar to FIG. 5 showing another alternative configuration for the cylindrical protrusion and the corresponding cavity in the housing.

FIG. 8 illustrates another variation in which the protuberance 26 possesses a circular cross-section and the cavity 27 in the housing 28 that receives the protuberance 26 possesses an elongated or oblong shape. The cavity 27 is elongated or oblong in the direction of the line 19 which connects the two center points of the two protuberances 6, 26. That is, the longer dimension of the oblong cavity 27 is parallel to and along the line 19, while the shorter dimension of the oblong cavity 27 is perpendicular to the line. Thus, the protuberance 26 and its respective cavity 27 are made such that the protuberance 26 can be essentially freely positioned within the respective cavity 27 in the direction of the line 19 which connects the two center points of the two protuberances 6, 26, yet the protuberance 26 adjoins at least at one point the peripheral surface of the cavity 27 in the diametrical direction of the cavity 27 which is perpendicular to the line 19. In the illustrated embodiment, the protuberance 26 adjoins or tightly engages the periphery of the cavity 27 at two positions located diametrically opposite one another on a line perpendicular to the line 19. The smaller dimension of the oblong-shaped protuberance 26 is smaller than the outer diameter of the other cylindrically shaped protuberance 6 (shown in FIG. 4). It is to be understood that the protuberance 26 shown in FIG. 8 is provided on a housing cover which also includes the protuberance 6 shown in FIG. 4 which is adapted to engage its respective cavity in the manner described above.

The principles, preferred embodiments and mode of operation have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A housing sealing cover mounted on a housing,
    the housing comprising at least a first cavity and a second cavity;
    the cover comprising:
    a central hole holding a gasket for a shaft which is adapted to extend in an axial direction through the gasket in an installed state;

at least first and second hollow-cylindrical protuberances which project in the axial direction relative to areas of the cover directly surrounding the at least first and second hollow-cylindrical protuberances, the first hollow-cylindrical protuberance being positioned in the first cavity of the housing and the second hollow-cylindrical protuberances being positioned in the second cavity of the housing;

the first protuberance possessing an outer peripheral surface, with the outer peripheral surface of the first protuberance being accurately fit without play into the first cavity of the housing; and the second protuberance being configured relative to the second cavity of the housing such that the second protuberance is freely positioned within the second cavity in a direction along a line connecting center points of the first and second protuberances, with the second protuberance adjoining at least one point of an inner peripheral surface of the second cavity in a diametrical direction of the second cavity which is perpendicular to the line.

2. The housing sealing cover mounted on a housing according to claim 1, wherein the outside surface of the second protuberance is circularly cylindrical and the second cavity is shaped as an oblong hole that is oblong in a direction of the line.

3. The housing sealing cover mounted on a housing according to claim 1, wherein the second cavity receiving the second protuberance possesses a circular cylindrical shape.

4. The housing sealing cover mounted on a housing according to claim 3, wherein the outside surface of the second protuberance is made in at least one section with an elliptical cross section having a shorter minor axis oriented in the direction of the line.

5. The housing sealing cover mounted on a housing according to claim 3, wherein the outside surface of the second protuberance is circular cylindrical in shape with a diameter smaller than the diameter of the cavity, the outside surface of the second protuberance being provided with two bulges positioned diametrically opposite one another, each bulge possessing an apex, with a line passing through apices of the bulges being perpendicular to the line.

6. The housing sealing cover mounted on a housing according to claim 5, wherein at least one of the bulges extends at least in one section of the protuberance in the direction of a major axis of the protuberance.

7. The housing sealing cover mounted on a housing according to claim 1, wherein the outside surface of the first protuberance and the first cavity are made at least in one axial section according to a circular cylinder.

8. The housing sealing cover mounted on a housing according to claim 1, wherein at least areas of the cover surrounding the first and second protuberances are made of sheet metal.

9. The housing sealing cover mounted on a housing according to claim 1, wherein at least one of the first and second protuberances is made of a plastic.

10. The housing sealing cover mounted on a housing according to claim 1, wherein at least one of the protuberances is produced by injecting it onto a body.

11. The housing sealing cover mounted on a housing according to claim 1, wherein at least one of the protuberances is made as a screw passage hole for receiving a screw to attach the cover to the housing.

12. The housing sealing cover mounted on a housing according to claim 1, wherein the first and second protuberances attach and center the cover on the housing.

13. The housing sealing cover mounted on a housing according to claim 1, wherein the shaft is the crankshaft of a motor vehicle engine.

14. The housing sealing cover mounted on a housing according to claim 1, further comprising at least one screw passing through the first protuberance, extending into the first cavity and terminating in the first cavity.

15. The housing sealing cover mounted on a housing according to claim 1, wherein the first cavity is a blind bore.

16. A housing and sealing cover arrangement comprising:
a housing comprising at least a first cavity and a second cavity;
a sealing cover mounted on the housing and positioned coaxially with the housing;
the cover possessing a central hole;
a gasket held in the central hole of the cover to seal a shaft which is adapted to extend in an axial direction through the gasket in an installed state;
the cover comprising at least first and second hollow-cylindrical protuberances which project in the axial direction relative to areas of the cover directly surrounding the at least first and second hollow-cylindrical protuberances, the first hollow-cylindrical protuberance being positioned in the first cavity of the housing and the second hollow-cylindrical protuberances being positioned in the second cavity of the housing;
the first protuberance possessing an outer peripheral surface that is accurately fit without play into the first cavity of the housing; and
the second protuberance being of a different profile than the first protuberance and configured relative to the second cavity of the housing such that the second protuberance is freely positioned within the second cavity in a direction along a line connecting center points of the first and second protuberances, with the second protuberance adjoining at least one point of an inner peripheral surface of the second cavity in a diametrical direction of the second cavity which is perpendicular to the line.

17. The housing and sealing cover arrangement according to claim 16, further comprising at least one screw passing through the first protuberance, extending into the first cavity and terminating in the first cavity.

18. The housing and sealing cover arrangement according to claim 16, wherein the first cavity is a blind bore.

* * * * *